United States Patent
Patel

(10) Patent No.: US 6,540,040 B1
(45) Date of Patent: Apr. 1, 2003

(54) VEHICLE SAFETY SYSTEM REQUIRING SEAT BELT USE

(76) Inventor: Dilip Patel, 11443 Excelsior Dr., Norwalk, CA (US) 90650

( * ) Notice: Subject to any disclaimer, the term of this patent is extended or adjusted under 35 U.S.C. 154(b) by 0 days.

(21) Appl. No.: 09/616,789

(22) Filed: Jul. 14, 2000

(51) Int. Cl.⁷ .............................................. B60R 21/00
(52) U.S. Cl. ...................... 180/269; 180/271; 180/273; 180/268; 180/286; 280/801.1
(58) Field of Search ................. 180/286, 271, 180/273, 268, 269; 280/801.1

(56) References Cited

U.S. PATENT DOCUMENTS

| | | | | |
|---|---|---|---|---|
| 3,014,549 A | * | 12/1961 | Freeman | 180/286 |
| 3,449,714 A | * | 6/1969 | Farley, Jr. | 280/801.1 |
| 3,874,474 A | * | 4/1975 | Quantz | 280/801.1 |
| 3,948,339 A | | 4/1976 | Iwanaga | 180/82 C |
| 3,960,235 A | | 6/1976 | Iijima | 180/82 A |
| 4,394,035 A | | 7/1983 | Sato | 280/804 |
| 5,760,684 A | * | 6/1998 | Orbach | 340/457.1 |
| 5,944,135 A | * | 8/1999 | Blackburn et al. | 180/268 |
| 5,970,587 A | * | 10/1999 | Knox | 24/633 |
| 6,018,292 A | * | 1/2000 | Penny, Jr. | 340/426 |

FOREIGN PATENT DOCUMENTS

| | | | | |
|---|---|---|---|---|
| AU | 402370 | * | 12/1967 | 180/268 |
| DE | 2312811 | * | 9/1973 | 180/268 |
| DE | 2444922 | * | 4/1976 | 180/268 |
| DE | 2753331 | * | 5/1979 | 180/286 |
| GB | 1404357 | * | 8/1975 | |
| JP | 61-9360 | * | 1/1986 | 280/801.1 |
| JP | 6-144156 | * | 5/1994 | 280/801.1 |

* cited by examiner

*Primary Examiner*—Eric Culbreth
(74) *Attorney, Agent, or Firm*—Goldstein & Lavas, P.C.

(57) ABSTRACT

A vehicle safety system requiring seat belt use including a car seat positioned within the vehicle. The car seat has a seat portion and a back portion. A seat belt is coupled with respect to the car seat. The seat belt is comprised of a shoulder harness and a waist belt together joined with a belt buckle. The seat belt includes a buckle receptacle secured to the seat portion for receiving the belt buckle in a locked orientation. The buckle receptacle includes a release button for releasing the belt buckle from the buckle receptacle in an unlocked orientation. A sensor system is disposed within the vehicle. The sensor system includes a main sensor in communication with the transmission of the vehicle.

6 Claims, 3 Drawing Sheets

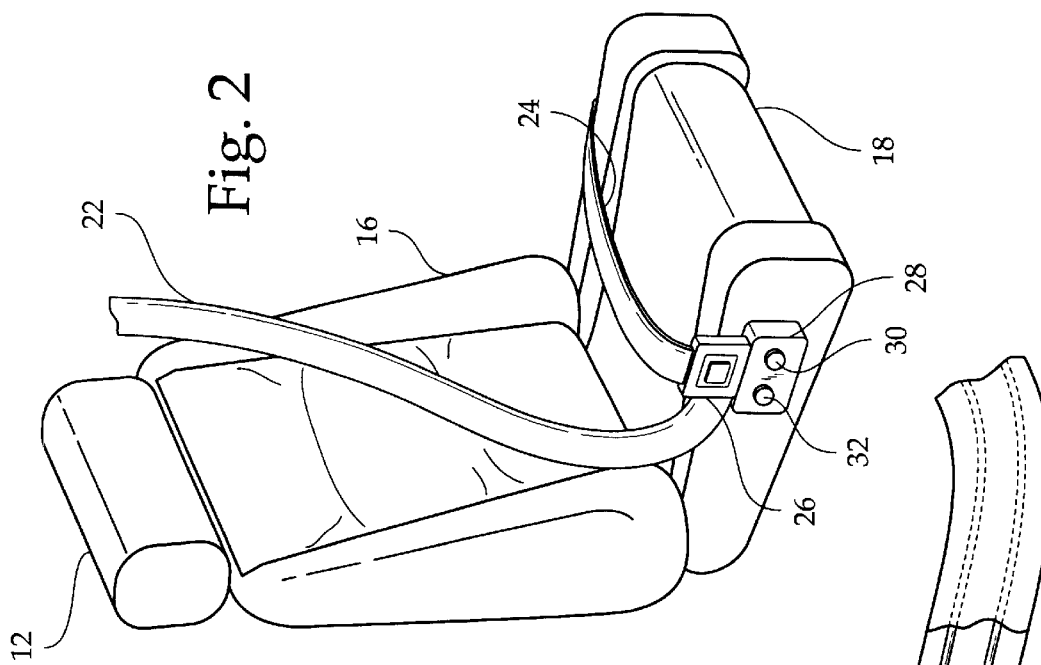
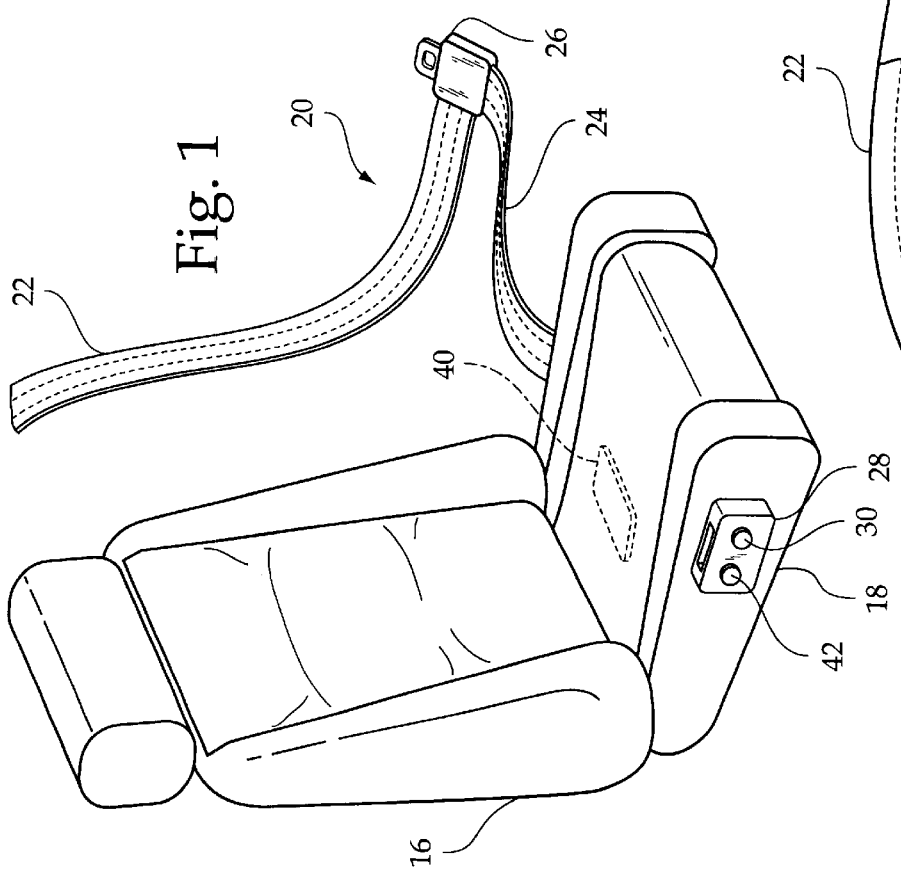
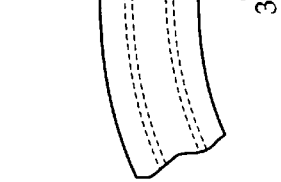

VEHICLE SAFETY SYSTEM REQUIRING SEAT BELT USE

BACKGROUND OF THE INVENTION

The present invention relates to a vehicle safety system requiring seat belt use and more particularly pertains to preventing a vehicle from being driven without having a seat belt fastened.

The use of vehicle safety devices is known in the prior art. More specifically, vehicle safety devices heretofore devised and utilized for the purpose of providing advanced safety to occupants of motor vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,960,235 to Iijima discloses a device capable of locking the transmission of a motor vehicle if the driver fails to fasten the seat belt. U.S. Pat. No. 3,948,339 to Iwanaga discloses an automotive device with means for preventing a transmission from being shifted into drive until the driver fastens his seat belt. U.S. Pat. No. 4,394,035 to Sato discloses an automobile seat belt system with a control capable of preventing the belt from being released when the door is opened under certain conditions.

While these devices fulfill their respective, particular objective and requirements, the aforementioned patents do not describe a vehicle safety system requiring seat belt use for preventing a vehicle from being driven without having a seat belt fastened.

In this respect, the vehicle safety system requiring seat belt use according to the present invention substantially departs from the conventional concepts and designs of the prior art, and in doing so provides an apparatus primarily developed for the purpose of preventing a vehicle from being driven without having a seat belt fastened.

Therefore, it can be appreciated that there exists a continuing need for a new and improved vehicle safety system requiring seat belt use which can be used for preventing a vehicle from being driven without having a seat belt fastened. In this regard, the present invention substantially fulfills this need.

SUMMARY OF THE INVENTION

In the view of the foregoing disadvantages inherent in the known types of vehicle safety devices now present in the prior art, the present invention provides an improved vehicle safety system requiring seat belt use. As such, the general purpose of the present invention, which will be described subsequently in greater detail, is to provide a new and improved vehicle safety system requiring seat belt use which has all the advantages of the prior art and none of the disadvantages.

To attain this, the present invention essentially comprises a car seat positioned within the vehicle. The car seat has a seat portion and a back portion. A seat belt is coupled with respect to the car seat. The seat belt is comprised of a shoulder harness and a waist belt together joined with a belt buckle. The seat belt includes a buckle receptacle secured to the seat portion for receiving the belt buckle in a locked orientation. The buckle receptacle includes a release button for releasing the belt buckle from the buckle receptacle in an unlocked orientation. A sensor system is disposed within the vehicle. The sensor system includes a main sensor in communication with the transmission of the vehicle. The sensor system includes a first sensor disposed within the shoulder harness and the waist belt of the seat belt. The first sensor is comprised of a pair of wires extending a length of the shoulder harness and the waist belt. The first sensor is in communication with the main sensor. The sensor system includes a second sensor disposed within the seat portion of the car seat. The second sensor is in communication with the main sensor. The sensor system includes a third sensor disposed within the buckle receptacle. The third sensor is in communication with the main sensor. The sensor system includes a deactivation switch.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle safety system requiring seat belt use which has all the advantages of the prior art vehicle safety devices and none of the disadvantages.

It is another object of the present invention to provide a new and improved vehicle safety system requiring seat belt use which may be easily and efficiently manufactured and marketed.

It is a further object of the present invention to provide a new and improved vehicle safety system requiring seat belt use which is of durable and reliable construction.

An even further object of the present invention is to provide a new and improved vehicle safety system requiring seat belt use which is susceptible of a low cost of manufacture with regard to both materials and labor, and which accordingly is then susceptible of low prices of sale to the consuming public, thereby making such a vehicle safety system requiring seat belt use economically available to the buying public.

Even still another object of the present invention is to provide a new and improved vehicle safety system requiring seat belt use for preventing a vehicle from being driven without having a seat belt fastened.

Lastly, it is an object of the present invention to provide a new and improved vehicle safety system requiring seat belt use including a car seat positioned within the vehicle. The car seat has a seat portion and a back portion. A seat belt is coupled with respect to the car seat. The seat belt is comprised of a shoulder harness and a waist belt together joined with a belt buckle. The seat belt includes a buckle receptacle secured to the seat portion for receiving the belt buckle in a locked orientation. The buckle receptacle includes a release button for releasing the belt buckle from the buckle receptacle in an unlocked orientation. A sensor system is disposed within the vehicle. The sensor system includes a main sensor in communication with the transmission of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the vehicle safety system requiring seat belt use constructed in accordance with the principles of the present invention.

FIG. 2 is a perspective view of the present invention illustrating the seat belt in the locked orientation.

FIG. 3 is a sectional view of the seat belt illustrating the first sensor disposed therein.

The same reference numerals refer to the same parts through the various figures.

DESCRIPTION OF THE PREFERRED EMBODIMENT

Figure 5:
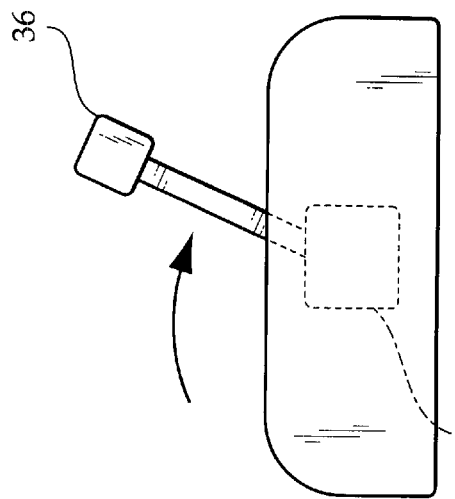
FIG. 5 is a side view of a transmission of the motor vehicle in a locked orientation.
Figure 6:
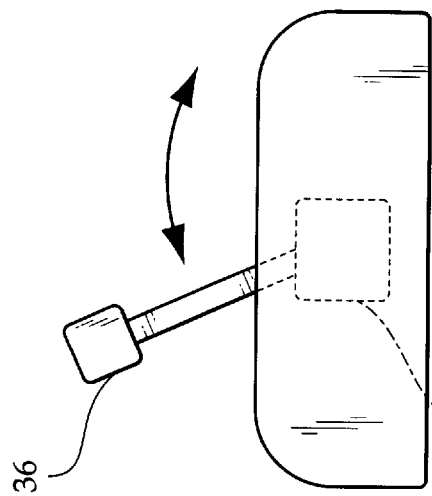
FIG. 6 is a side view of the transmission of the motor vehicle in an unlocked orientation.
Figure 4:
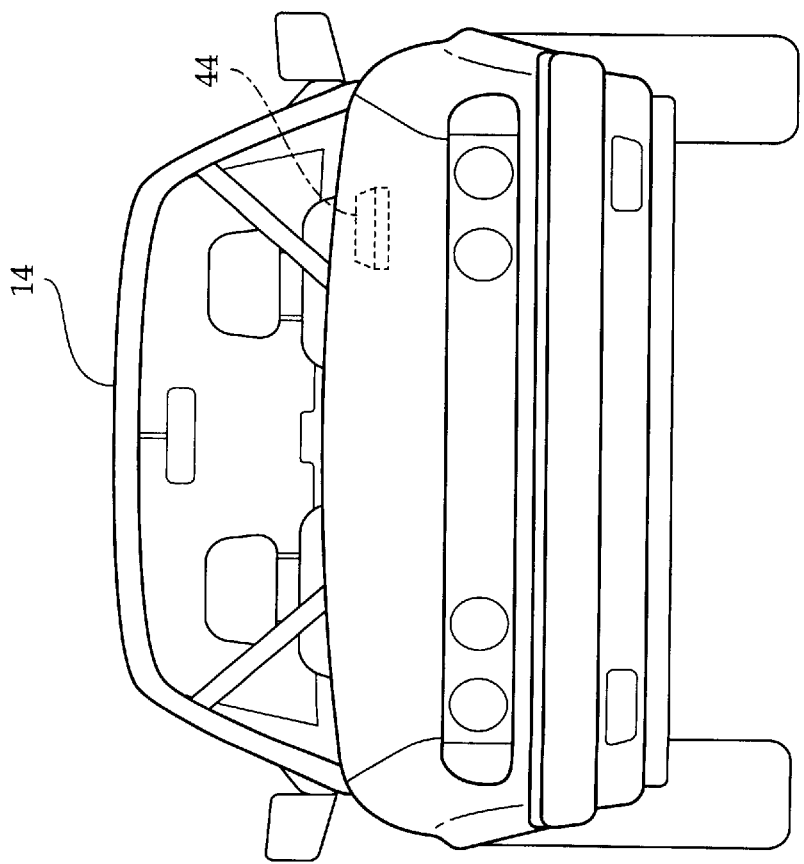
FIG. 4 is a front view of a motor vehicle illustrating the deactivation switch under the hood.
Figure 7:
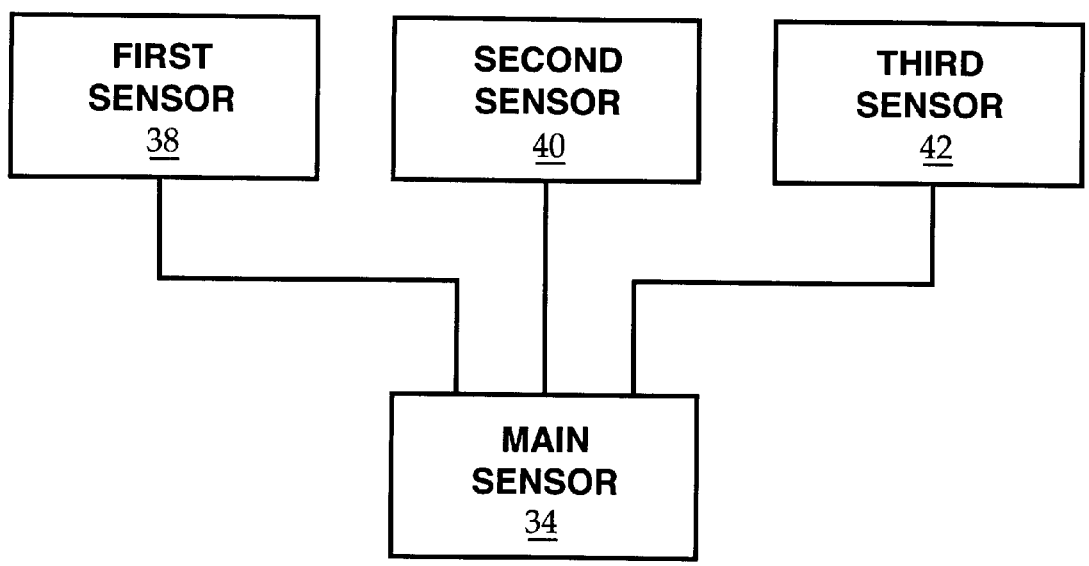
FIG. 7 is a block diagram, illustrating interconnection of the sensors of the present invention.

With reference now to the drawings, and in particular, to FIGS. 1 through 6 thereof, the preferred embodiment of the new and improved vehicle safety system requiring seat belt use embodying the principles and concepts of the present invention and generally designated by the reference number 10 will be described.

Specifically, it will be noted in the various figures that the device relates to a vehicle safety system requiring seat belt use for preventing a vehicle from being driven without having a seat belt fastened. In its broadest context, the device consists of a car seat, a seat belt, and a sensor system. Such components are individually configured and correlated with respect to each other so as to attain the desired objective.

The car seat 12 is positioned within the vehicle 14. The car seat 12 has a seat portion 16 and a back portion 18. The car seat 12 resembles the typical car seat found in motor vehicles.

The seat belt 20 is coupled with respect to the car seat 12. The seat belt 20 is comprised of a shoulder harness 22 and a waist belt 24 together joined with a belt buckle 26. The seat belt 20 includes a buckle receptacle 28 secured to the seat portion 18 for receiving the belt buckle 26 in a locked orientation. The buckle receptacle 28 includes a release button 30 for releasing the belt buckle 26 from the buckle receptacle 28 in an unlocked orientation. The release button 30 would be pressed only in case of an emergency. Once the release button 30 has been pressed, an audible alarm will be set off within the vehicle requiring the driver to fasten the belt buckle 26 to the buckle receptacle 28 to deactivate the alarm. The present invention could also include a system shut down function in the case where the belt buckle 26 has been released from the buckle receptacle 28 for an extended period of time. In this instance, the automobile dealer would be the only place that could reset the system.

The sensor system is disposed within the vehicle 14. The sensor system includes a main sensor 34 in communication with the transmission 36 of the vehicle 14. The sensor system includes a first sensor 38 disposed within the shoulder harness 22 and the waist belt 24 of the seat belt 20. The first sensor 38 is comprised of a pair of wires extending a length of the shoulder harness 22 and the waist belt 24. The first sensor 38 is in communication with the main sensor 34. The first sensor 38 can only be activated if one of the pair of wires have been cut. The sensor system includes a second sensor 40 disposed within the seat portion 18 of the car seat 12. The second sensor 40 is in communication with the main sensor 34. The second sensor 40 must be active in order for the transmission to operate. The second sensor 40 acts as a weight sensor. Thus, when someone is sitting on the seat portion 18, the transmission will operate. The sensor system includes a third sensor 42 disposed within the buckle receptacle 28. The third sensor 42 is in communication with the main sensor 34. This third sensor 42 requires the belt buckle to be inserted within the buckle receptacle 28 in order to operate the transmission. The sensor system includes a deactivation switch 44. The deactivation switch 44 is preferably located beneath the hood 46 of the vehicle 14. The deactivation switch 44 will allow a mechanic to deactivate the sensor system in order to work on the vehicle 14. Additionally, if any of the abovementioned components have been modified or tampered with, the vehicle will have to be brought to the dealer in order to reset the system. The main sensor 34 will be provided with an individual code number so only the car dealer can reset the system after matching the vehicle identification number with the individual code number. Additionally, the system can be placed in automobiles as an after market addition. In this situation, the main sensor 34 will have the reset switch to reset the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle safety system requiring seat belt use for preventing a vehicle from being driven without having a seat belt fastened by preventing use of a transmission system of the vehicle, the system comprising, in combination:

a car seat positioned within the vehicle, the car seat having a seat portion and a back portion;

a seat belt coupled with respect to the car seat, the seat belt being comprised of a shoulder harness and a waist belt together joined with a belt buckle, the seat belt including a buckle receptacle secured to the seat portion for receiving the belt buckle in a locked orientation, the buckle receptacle including a release button for releasing the belt buckle from the buckle receptacle in an unlocked orientation; and a sensor system disposed within the vehicle, the sensor system including a main sensor in communication with the transmission system of the vehicle, the sensor system including a first sensor disposed within the shoulder harness and the waist belt of the seat belt, the first sensor being comprised of a pair of wires extending a length of the shoulder harness and the waist belt, the first sensor being in communication with the main sensor, the sensor system including a second sensor disposed within the seat portion of the car seat, the second sensor being in communication with the main sensor, the sensor system including a third sensor disposed within the buckle receptacle, the third sensor being in communication with the main sensor, the sensor system including a deactivation switch.

2. A vehicle safety system requiring seat belt use for preventing a vehicle from being driven without having a seat belt fastened by preventing use of a transmission system of the vehicle, the system comprising, in combination:

a car seat positioned within the vehicle, the car seat having a seat portion and a back portion;

a seat belt coupled with respect to the car seat, the seat belt being comprised of a shoulder harness and a waist belt together joined with a belt buckle, the seat belt including a buckle receptacle secured to the seat portion for receiving the belt buckle in a locked orientation, the buckle receptacle including a release button for releasing the belt buckle from the buckle receptacle in an unlocked orientation; and a sensor system disposed within the vehicle, the sensor system having a main sensor in communication with the transmission system of the vehicle and a first sensor disposed within the shoulder harness and the waist belt of the seat belt, the first sensor being in communication with the main sensor.

3. The vehicle safety system requiring seat belt use as set forth in claim 2, wherein the first sensor is comprised of a pair of wires extending a length of the shoulder harness and the waist belt.

4. The vehicle safety system requiring seat belt use as set forth in claim 2, wherein the sensor system includes a second sensor disposed within the seat portion of the car seat, the second sensor being in communication with the main sensor.

5. The vehicle safety system requiring seat belt use as set forth in claim 2, wherein the sensor system includes a third sensor disposed within the buckle receptacle, the third sensor being in communication with the main sensor.

6. The vehicle safety system requiring seat belt use as set forth in claim 2, wherein the sensor system includes a deactivation switch.

* * * * *